(12) United States Patent
Liu et al.

(10) Patent No.: US 10,306,643 B2
(45) Date of Patent: *May 28, 2019

(54) SYSTEM AND METHOD FOR IMPROVED BAND-CHANNEL SCANNING AND NETWORK SWITCHING

(71) Applicant: Google LLC, Mountain View, CA (US)

(72) Inventors: Junda Liu, Mountain View, CA (US); Weihua Tan, Fremont, CA (US); Shishir Kumar Agrawal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,651

(22) Filed: Apr. 2, 2018

(65) Prior Publication Data

US 2018/0227921 A1    Aug. 9, 2018

Related U.S. Application Data

(63) Continuation of application No. 14/552,080, filed on Nov. 24, 2014, now Pat. No. 9,942,900.

(51) Int. Cl.
*H04W 72/00* (2009.01)
*H04W 72/04* (2009.01)
(Continued)

(52) U.S. Cl.
CPC ... *H04W 72/0453* (2013.01); *H04W 36/0072* (2013.01); *H04W 48/14* (2013.01); *H04W 48/18* (2013.01); *H04W 72/048* (2013.01); *H04W 72/0486* (2013.01); *H04W 64/00* (2013.01); *H04W 64/006* (2013.01); *H04W 88/06* (2013.01)

(58) Field of Classification Search
CPC .................................................. H04W 72/00
See application file for complete search history.

(56) References Cited

U.S. PATENT DOCUMENTS 6,128,490 A   10/2000  Shaheen et al.
6,633,761 B1  10/2003  Singhal et al.
(Continued)

FOREIGN PATENT DOCUMENTS

WO   2013020598 A1   2/2013
WO   2013044359 A1   4/2013

OTHER PUBLICATIONS

Ge et al., "A History-Based Handover Prediction for LTE Systems" Computer Network and Multimedia Technology. CNMT. International Symposium on , vol., No., pp. 1,4, 18-20 (Jan. 2009).
(Continued)

*Primary Examiner* — Christopher M Brandt
(74) *Attorney, Agent, or Firm* — IP Spring (57) ABSTRACT

A system and method is disclosed that includes receiving connectivity information from a plurality of client devices connect to a network associated with a plurality of base stations; storing the connectivity information in one or more memories; determining a first location of a first device that desires to connect to a base station associated with the network; identifying a set of candidate bands and channels for connection to the base station based on the first location and the connectivity information; and transmitting the set of candidate bands and channels to the first device.

21 Claims, 7 Drawing Sheets

(51) Int. Cl.
  *H04W 36/00*  (2009.01)
  *H04W 48/18*  (2009.01)
  *H04W 48/14*  (2009.01)
  *H04W 64/00*  (2009.01)
  *H04W 88/06*  (2009.01)

(56) References Cited

U.S. PATENT DOCUMENTS

| | | | |
|---|---|---|---|
| 7,509,131 | B2 | 3/2009 | Krumm et al. |
| 7,848,292 | B2 | 12/2010 | Bi et al. |
| 8,131,317 | B2 | 3/2012 | Lee |
| 8,155,081 | B1 | 4/2012 | Mater et al. |
| 8,165,581 | B2 | 4/2012 | Joshi et al. |
| 8,200,217 | B2 | 6/2012 | Kanade et al. |
| 8,477,645 | B2 | 7/2013 | Scherzer et al. |
| 8,542,637 | B2 | 9/2013 | Bandhakavi et al. |
| 8,565,766 | B2 | 10/2013 | Scherzer et al. |
| 9,084,169 | B2 | 7/2015 | Cui et al. |
| 2004/0058678 | A1 | 3/2004 | deTorbal |
| 2005/0245269 | A1 | 11/2005 | Demirhan et al. |
| 2006/0098625 | A1 | 5/2006 | King et al. |
| 2006/0193295 | A1 | 8/2006 | White et al. |
| 2007/0037550 | A1 | 2/2007 | Rassam |
| 2007/0049274 | A1 | 3/2007 | Yacobi et al. |
| 2007/0064684 | A1 | 3/2007 | Kottilingal |
| 2007/0064894 | A1 | 3/2007 | Armstrong et al. |
| 2007/0104166 | A1 | 5/2007 | Rahman et al. |
| 2007/0127391 | A1 | 6/2007 | Goodman |
| 2007/0140163 | A1 | 6/2007 | Meier et al. |
| 2008/0002668 | A1 | 1/2008 | Asokan et al. |
| 2008/0233977 | A1 | 9/2008 | Xu et al. |
| 2009/0168757 | A1 | 7/2009 | Bush |
| 2010/0172323 | A1 | 7/2010 | Rexhepi et al. |
| 2011/0096673 | A1 | 4/2011 | Stevenson et al. |
| 2011/0216694 | A1 | 9/2011 | Plasberg et al. |
| 2011/0269423 | A1 | 11/2011 | Schell et al. |
| 2011/0310867 | A1 | 12/2011 | Kennedy et al. |
| 2012/0108206 | A1 | 5/2012 | Haggerty |
| 2012/0178488 | A1 | 7/2012 | Jonker et al. |
| 2013/0165117 | A1 | 6/2013 | Narayanan |
| 2013/0225169 | A1 | 8/2013 | Farnsworth et al. |
| 2013/0227647 | A1 | 8/2013 | Thomas et al. |
| 2013/0230023 | A1 | 9/2013 | Gray et al. |
| 2013/0303156 | A1 | 11/2013 | Astrom et al. |
| 2013/0337778 | A1 | 12/2013 | Ye et al. |
| 2014/0045505 | A1 | 2/2014 | Henry et al. |
| 2014/0066050 | A1 | 3/2014 | Kotecha et al. |
| 2014/0071895 | A1 | 3/2014 | Bane et al. |
| 2014/0080539 | A1 | 5/2014 | Scherzer et al. |
| 2014/0127992 | A1 | 5/2014 | Kuscher et al. |
| 2014/0148100 | A1 | 5/2014 | Kim et al. |
| 2014/0148170 | A1 | 5/2014 | Damji et al. |
| 2014/0211648 | A1 | 7/2014 | Rahmati et al. |
| 2014/0213256 | A1 | 7/2014 | Meylan et al. |
| 2014/0219122 | A1 | 8/2014 | Nakamura et al. |
| 2014/0222570 | A1 | 8/2014 | Devolites et al. |
| 2015/0256993 | A1 | 9/2015 | Bellamkonda et al. |
| 2015/0351012 | A1* | 12/2015 | Chhabra ............... H04W 48/16 455/434 |
| 2016/0065265 | A1 | 3/2016 | Hassan et al. |

OTHER PUBLICATIONS

Gemalto N.V. "Card ADMIN," Document Reference D1225357A (Jun. 2, 2011).
DICODA.com. "Multi IMSI," Dicoda.com (Jun. 20, 2013) (available at: https://web.archive.org/web/20130620191315/http://www.dicoda.com/introduction/imsi).
Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).
Tobias, Marc Weber. "The Split Personality Cell Phone That Saves You Money on Overseas Calling," Forbes.com (Aug. 20, 2013) (available at: http://onforb.es/14gMCe4).
"Circuit-switched fallback. The first phase of voice evolution for mobile LTE devices." Qualcomm Incorporated, 2012 11 pages.
CMSG. "Reprogrammable SIMs: Technology, Evolution and Implications," Final Report (Sep. 25, 2012) (available at: http://stakeholders.ofcom.org.uk/binaries/research/telecomsresearch/reprogrammable-sims.pdf).
"Feature Requests—Republic Wireless Wiki," http://republicwireless.wikia.com/wiki/Feature_Requests 1 page.
"Republic Wireless," http://republicwireless.com 2 pages.
"T-Mobile's 4G Network—Check Your Coverage—T-Mobile Blazing Fast 4G Coverage" 9 pages.
"What is VoLTE I Voice Over LTE I Tutorial," Radio-Electronics.com, http://www.radio-electronics.com/info/cellulartelecomms/lte-long-termevolution/voice-over-lte-volte.php 5 pages.
Korean Intellectual Property Office, International Search Report and the Written Opinion in International Application No. PCT/US2014/057709, dated Dec. 29, 2014.

* cited by examiner

SYSTEM AND METHOD FOR IMPROVED BAND-CHANNEL SCANNING AND NETWORK SWITCHING

CROSS-REFERENCE TO RELATED APPLICATION

This Application is a continuation application claiming priority under 35 U.S.C. § 120 to U.S. patent application Ser. No. 14/552,080 entitled "System and Method for Improved Band-Channel Scanning and Network Switching," filed 24 Nov. 2014, the contents of which are incorporated herein by reference in their entirety as if fully set forth below.

BACKGROUND

A wireless communication device, when initially turned on or when returning from an out of service condition, can perform a scan of radio frequencies to determine a set of potential wireless base stations (or base station equivalents) with which to attempt to associate and/or connect. As is known, the wireless communication device can operate using one or more different radio access technologies in accordance with one or more different wireless communication protocols. Examples of different wireless communication protocols include second-generation wireless telephone technology (2G), third generation of mobile telecommunications technology (3G), fourth generation of mobile telecommunications technology (4G), such as a Long Term Evolution (LTE) wireless communication protocol as published by the Third Generation Partnership Project (3GPP) standardization group, among others.

Wireless communications use predefined frequency ranges, usually referred as bands. The bands are typically formed of a contiguous range of radio frequencies. When a wireless communication device tries to establish a wireless connection, the wireless communication device does band scanning to determine the frequencies on which a base station may be operating. In conventional techniques, the wireless communication device iterates through all known bands until it finds the right one. As signal processing advances and more wireless spectrum is opened up to carriers, there are more and more bands for the wireless communication device to scan. For example, the 4G LTE currently defines more than 40 bands, where each band can have more than 100 channels. In fact, the 3GPP specification allows 65,536 unique channels for LTE communications. As such, scanning can take a long time and consumes a lot of batter power of the wireless communication device, causing slow network attachment and faster battery drain.

To make it worse, carriers have adopted different bands for LTE deployments in different parts of the world (e.g., North America, South America, Europe, Asia-Pacific, and Africa & Middle East). Thus, the operational bands in one region of the world may be different than the operational bands in another region of the world, making scanning more difficult.

One conventional approach to band/channel scanning is to scan from beginning to end of possible bands and channels in sequential order. This approach suffers from the drawback of being extremely inefficient.

Another conventional approach to improve the speed in which a connection is established is to remember recently connected channels, and begin checking those channels first, hoping that the wireless communication device can connect to a previously connected channel again. One shortcoming of this approach is that when a wireless communication device moves from one location to another, the same channel may not be available at the new location. This approach was used successfully when there were only a few channels available worldwide, but is not as effective today due to the large number of possible channels.

SUMMARY

One embodiment provides a method that includes receiving connectivity information from a plurality of client devices connect to a network associated with a plurality of base stations; storing the connectivity information in one or more memories; determining a first location of a first device that desires to connect to a base station associated with the network; identifying a set of candidate bands and channels for connection to the base station based on the first location and the connectivity information; and transmitting the set of candidate bands and channels to the first device.

Another embodiment includes a client device configured to access one or more carrier networks via one or more base stations. The client device includes a radio access interface configured to access one or more base stations; a memory storing instructions; and a processor. The processor executes the instruction to determine that the client device is connected to a first network, scan for other available networks, determine that a second network is available, and, in response to determining that the second network provides a better network connection than the first network, switch to the second network from the first network based on connecting to one of a set of candidate bands and channels received from a server, wherein the set of candidate bands and channels is based on a location of the client device.

Other aspects, objectives and advantages of the disclosure will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present disclosure and, together with the description, serve to explain the principles of the disclosure.

DETAILED DESCRIPTION

As described in greater detail herein, some embodiments of the disclosure provide for faster and more reliable establishment of a connection between the wireless communication device and a base station. As described, a base station may operate in a certain frequency band and at a certain channel within the band. Embodiments of the disclosure provide for faster and more reliable scanning for the appropriate band and channel to establish a connection to a base station. Also, some embodiments provide for switching between networks to improve network connectivity.

According to certain embodiments, various devices that connect to different base stations can report their connectivity information to a server. The connectivity information may include one or more of a device location, details about the connected base station, a frequency band and channel, and other metrics of the network. The connectivity information is stored in the database and can be aggregated by the server. Some embodiments leverage the connectivity information stored in the database and use the information to improve band scanning by providing a list of candidate bands and channels to devices attempting to connect to the network.

For example, if a carrier owns three different bands (e.g., bands B1, B2, and B3), instead of having a client device scan the bands in order (e.g., scan B1 first, then B2, then B3), some embodiments can start scanning band B3 first if the client device knows that there is no band B1 or B2 deployed in the area of the client device. In another example, if device D1 is already connected to a base station using band B3 and channel C1, when a different device D2 moves to the same covered area, the device D2 may attempt to connect to band B3 and channel C1 directly, without attempting to connect to bands B1 or B2 first. Another example is that if both bands B1 and B2 are available, and almost all users are on band B1, then a new device can connect to band B2, thereby getting better performance due to less congestion on the network.

Figure 1:
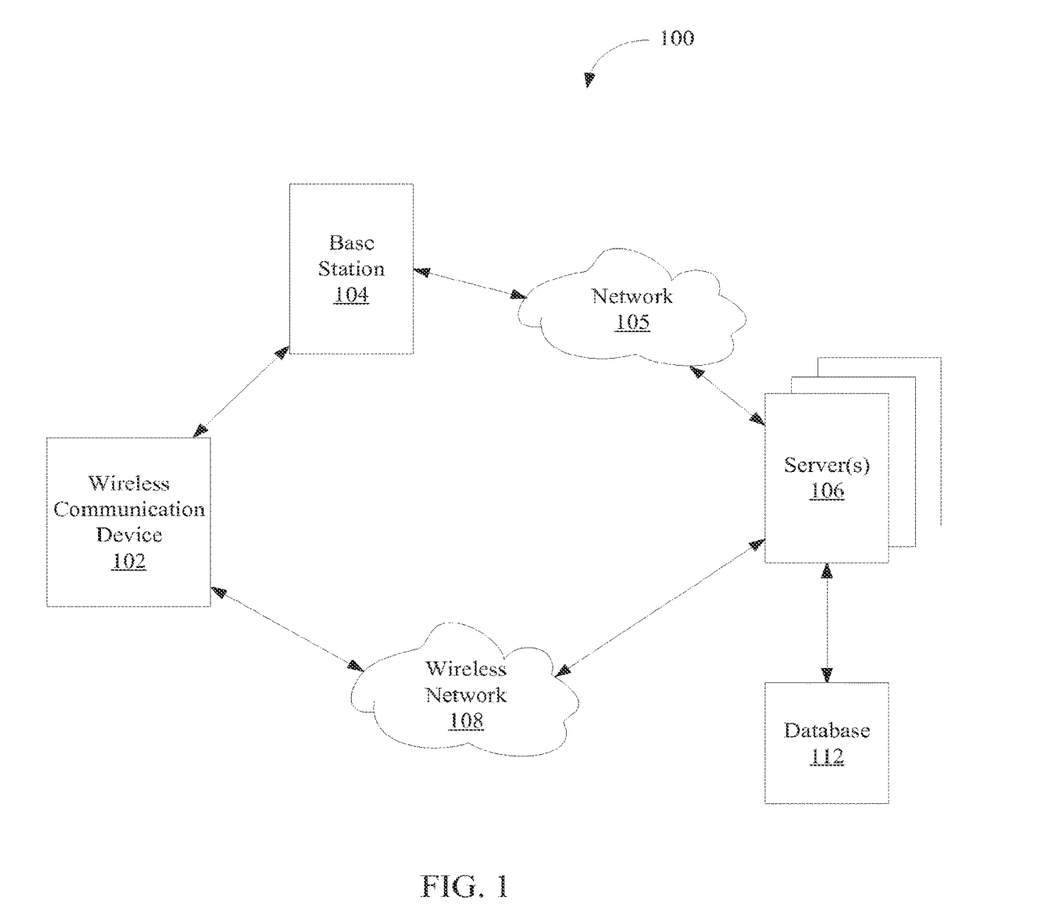
FIG. 1 is a conceptual diagram illustrating a wireless communication system in accordance with some example embodiments.

FIG. 1 is a conceptual diagram illustrating a wireless communication system 100 in accordance with some example embodiments. The system 100 can include a wireless communication device 102, a base station 104, server(s) 106, and database 112. For example, the wireless communication device 102 can be a cellular phone, such as a smart phone device, a tablet computing device, a laptop computing device, a watch with a computer operating system, a personal digital assistant (PDA), a video game console, a wearable or embedded digital device(s), or other computing device configured to wirelessly access a network. In some example embodiments, such as embodiments in which the wireless communication device 102 supports communication with an LTE wireless network, the wireless communication device 102 can be referred to as a user equipment (UE).

The wireless communication device 102 can communicate using a variety of wireless communication protocols that are based on particular radio access technologies. For example, the wireless communication device 102 can be configured to connect to a network 105 via one or more radio access technologies that can be accessed via the base station 104 within the system 100. For example, in some example embodiments, the base station 104 can provide access to a network using a fourth generation (4G) cellular communications radio access technology, such as a radio access technology implementing an LTE technology, such as LTE, LTE-Advanced (LTE-A), or other present or future developed LTE standard. In other embodiments, the base station 104 can provide access to existing and/or future-developed networks that use a non-LTE, or a non-4G radio access technology. For example, a base station 104 can provide network access to a network via a third generation (3G) radio access technology, such as a Wideband Code Division Multiple Access (WCDMA) or other Universal Mobile Telecommunications System (UMTS) network, such as a Time Division Synchronous Code Division Multiple Access (TD-SCDMA) network. As a further example, a base station 104 can be configured to provide access to a network via a CDMA2000 radio access technology, such as a 1×RTT radio access technology, or other radio access technology standardized by the Third Generation Partnership Project 2 (3GPP2). As another example, a base station 104 can be configured to provide access to a network via a second generation (2G) radio access technology, such as a Global System for Mobile Communications (GSM) network.

The wireless communication device 102 can be configured to wirelessly access the network 105 via the base station 104. The base station 104 can be any type of cellular base station. For example, the base station 104 can be an evolved node B (eNB), e.g., as used in an LTE wireless network, a node B, e.g., as used in a UMTS wireless network, a base transceiver station (BTS), e.g., as used in a Code Division Multiple Access (CDMA) wireless network, and/or any other appropriate type of base station depending on the radio access technology implemented on the wireless network 105 in which the base station 104 operates. While only a single base station 104 is illustrated in FIG. 1, the wireless communication device 102 can be within signaling range of multiple base stations, and each base station can support multiple cells, each of which can use a different radio frequency channel. As such, the wireless communication device 102 can receive radio frequencies from multiple cells and/or multiple base stations on a number of different radio frequency channels. Base stations within signaling range of the wireless communication device 102 can use any of a variety of radio access technologies.

The base station 104 provides services to the wireless communication device 102, such as cellular voice, text, and data services. In one embodiment, each base station 104 is associated with a particular cellular carrier. In some embodiments, the wireless communication device 102 may be in communication range of multiple base stations from multiple carriers.

In some embodiments, as described in greater detail below, the wireless communication device 102 may be configured connect to the wireless network 105 via a multi-profile subscriber identity module (SIM) card on the wireless communication device 102 that securely stores the international mobile subscriber identity (IMSI) and related key used to identify and authenticate the subscriber of the wireless communication device 102 with one or more different carrier networks.

As described, some embodiments of the disclosure provide for a multi-profile UICC (Universal Integrated Circuit Card). The multi-profile UICC is a SIM card for mobile devices that can multiple store carrier profiles from one or more carriers. The multi-profile UICC can therefore be used to grant access to multiple carrier networks without needing multiple physical SIM cards. Examples of carrier networks include T-Mobile®, Sprint, etc. The wireless communication device may be configured to access one of the carrier profiles stored on the multi-profile SIM card, referred to as the "active carrier profile," which identifies the carrier network that can be accessed by the wireless communication device. The wireless communication device can also configured to add or remove carrier profiles from the SIM card and switch between the carrier profiles to access different carrier networks and/or different carrier plans.

As the discussion of the various devices, systems, and methods contained herein progresses, at points only a singular wireless communication device 102 or a singular wireless network may be discussed. In this regard, wireless communication device 102 or wireless network 105 in FIG. 1 are only referenced as being generally representative of a plurality of wireless communication devices and a plurality of wireless networks, respectively. Therefore, the functionality of wireless communication device 102 can be imported to the plurality of wireless communication devices.

Additionally, in certain embodiments, the wireless communication device 102 may collect location data that indicates a location of the wireless communication device 102. In certain embodiments, the location data includes a latitude, a longitude, and a timestamp of when the location data is determined. Generally, the latitude and longitude are collected to a certain precision that allows the location of wireless communication device 102 to be determined to within 5 to 100 meters. In doing so, the latitude and longitude data will be coarsened to the sixth decimal digit. One such technique to coarsen the longitude and latitude data is to multiply a raw latitude or longitude measurement by 1,000,000 and truncate any places in the resulting number beyond six digits after the decimal.

As an aside, the location data will only be collected if a user of the wireless communication device 102 has indicated that location data may be collected from the wireless communication device 102. In this regard, if the user configures the wireless communication device 102 such that location data is not to be collected, then location data for the wireless communication device 102 will not be collected.

In addition to the wireless communication device 102 being able to connect to the network 105 via the base station 104, the wireless communication device 102 can also connect to a wireless network 108 that does not involve a base station. Examples of such wireless networks 108 include Wide Area Networks (WAN), Wireless Local Area Networks (WLAN) such as the various IEEE 802.11 standards, or any other kind of wireless network that does not involve a cellular base station.

The wireless communication device 102 can communicate with server 106 via either the network 105 (i.e., via the base station 104) or via the wireless network 108. Although server 106 is illustrated as a single server, the server 106 could be implemented as a plurality of servers servicing specified geographic locations. Server 106 could also be implemented as a cloud server. A singular server 106 is illustrated for ease of description. This singular server illustration is not intended to limit the disclosure contained herein. The server 106 is communicatively coupled to one or more databases 112 for storing data. For example, the database 112 could store connectivity information received from various wireless communication devices, such as wireless communication device 102. The connectivity information may include the device location, details about the connected base station (e.g., an identifier corresponding to the particular base station to which the device is connected), a frequency band of the connection, a channel of the connection, and other metrics of the network. The connectivity information can be aggregated by the server 106. When a wireless communication device 102 is attempting to connect to the base station, the server 106 may transmit a set of candidate bands and/or channels to the wireless communication device 102, which may assist the wireless communication device 102 with selecting the appropriate band and/or channel to connect to the network.

Figure 2:
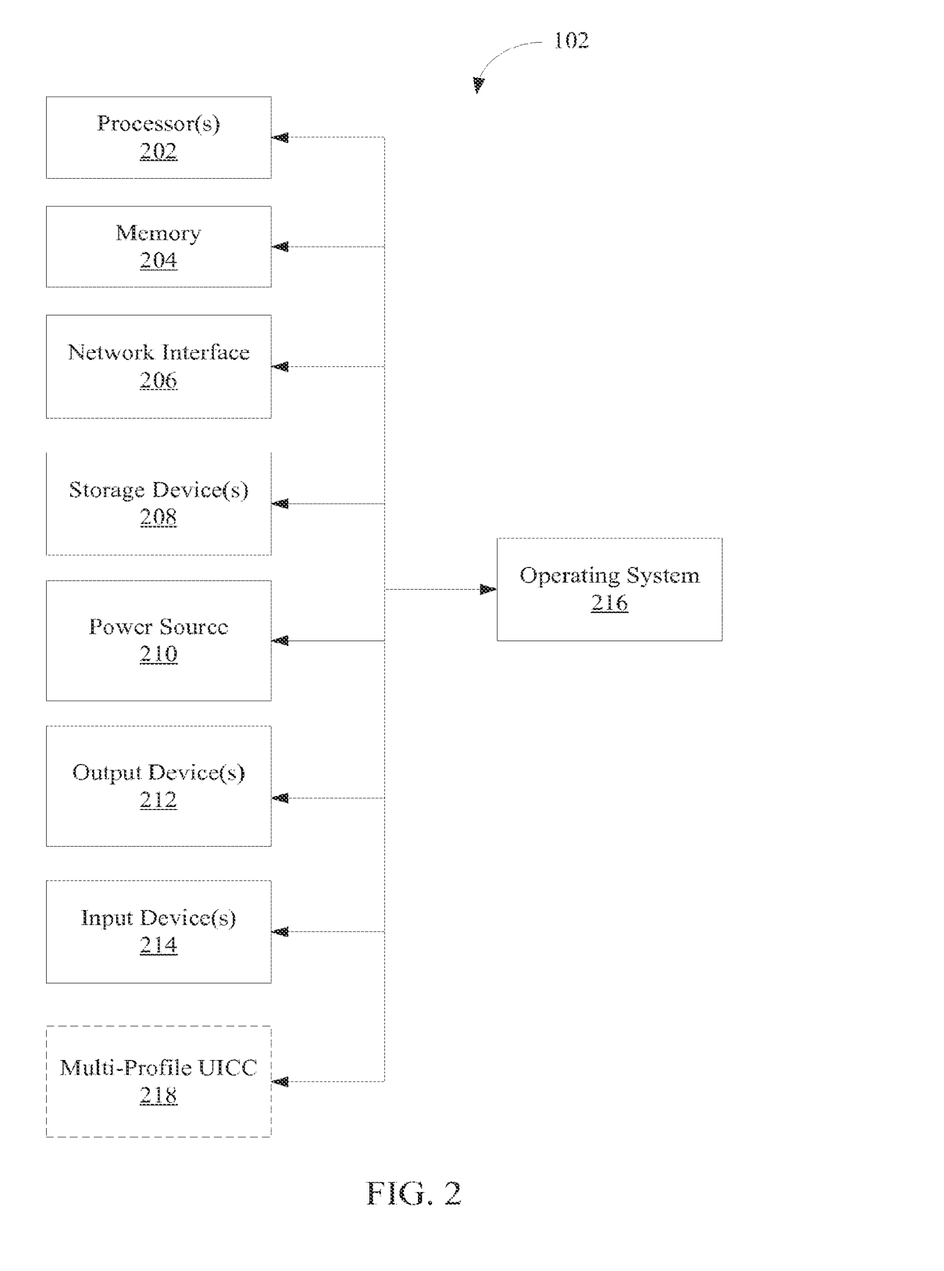
FIG. 2 is a conceptual diagram illustrating an example wireless communication device, according to one embodiment of the disclosure.

FIG. 2 is a conceptual diagram illustrating an example wireless communication device 102, according to one embodiment of the disclosure. In one example, the wireless communication device 102 shown in FIG. 2 is the same as wireless communication device 102 shown in FIG. 1. According to various embodiments, many other embodiments of the wireless communication device 102 may be used. In the illustrated embodiment of FIG. 2, the wireless communication device 102 includes one or more processors 202, memory 204, a network interface 206, one or more storage devices 208, power source 210, one or more output devices 212, one or more input devices 214, and (optionally) a multi-profile UICC 218. The wireless communication device 102 also includes an operating system 216. Each of the components including the processor 202, memory 204, network interface 206, storage device 208, power source 210, output device 212, input device 214, the optional multi-profile UICC 218, and the operating system 216 is interconnected physically, communicatively, and/or operatively for inter-component communications. In some embodiments, the operating system 216 is stored in the storage device(s) 208 and/or memory 204. In FIG. 2, the operating system 216 is shown outside of the storage device(s) 208 and memory 204 for ease of description.

As illustrated, processor 202 is configured to implement functionality and/or process instructions for execution within wireless communication device 102. For example, processor 202 executes instructions stored in memory 204 or instructions stored on a storage device 208. Memory 204, which may be a non-transient, computer-readable storage medium, is configured to store information within wireless communication device 102 during operation. In some embodiments, memory 204 includes a temporary memory, an area for information not to be maintained when the wireless communication device 102 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some examples, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The wireless communication device 102 uses network interface 206 to communicate with external devices, such as base station 104 in FIG. 1, via one or more wireless networks and other types of networks through which a communication with the wireless communication device 102 may be established, such as wireless network 108. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and USB.

The wireless communication device 102 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone, or any other type of input device. In some examples, a presence-sensitive screen includes a touch-sensitive screen.

One or more output devices 212 are also included in wireless communication device 102. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The wireless communication device 102 includes one or more power sources 210 to provide power to the wireless communication device 102. Non-limiting examples of power source 210 include single-use power sources, rechargeable power sources, and/or power sources developed from nickel-cadmium, lithium-ion, or other suitable material.

The wireless communication device 102 includes an operating system 216. The operating system 216 controls operations of the components of the wireless communication device 102. For example, the operating system 216 facilitates the interaction of the processor(s) 202, memory 204, network interface 206, storage device(s) 208, input device 214, output device 212, and power source 210.

As described in greater detail herein, in some embodiments, the wireless communication device 102 also includes an optional (i.e., optional being denoted by dashed lines in FIG. 2) multi-profile UICC (Universal Integrated Circuit Card) 218. The UICC 218 includes a SIM circuit that is configured to have stored thereon multiple carrier profiles. Each carrier profile includes the necessary data to allow the wireless communication device 102 to access a different carrier network. The wireless communication device 102 may also include software (as a stand-alone application or as part of the operating system 216) that allows the wireless communication device 102 to switch which carrier profile of the multiple profiles is the active carrier profile that is currently being used by the wireless communication device 102 to access a carrier network. For example, the user may choose to use the application to switch to a different active carrier profile when the user travels internationally with the wireless communication device 102 or travels outside of the coverage area of the previously current active carrier profile.

According to various embodiments, the wireless communication device 102 may include other elements not shown in FIG. 2, such as a GPS (Global Positioning System) transceiver, an accelerometer, a compass, a light, among other elements.

Figure 3:
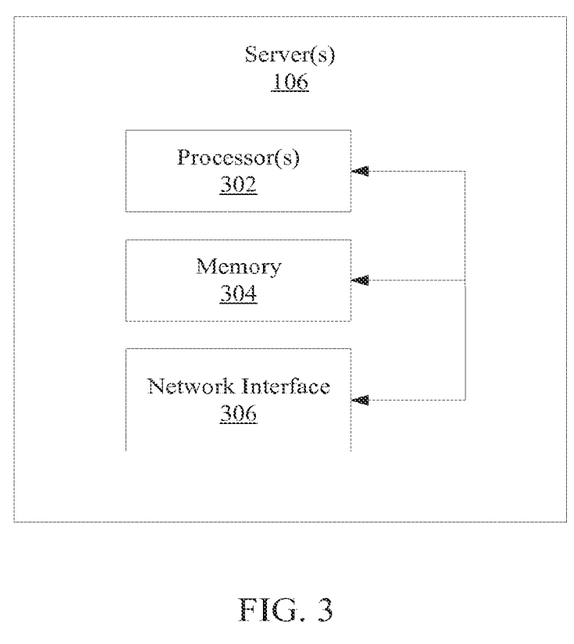
FIG. 3 is a block diagram of basic functional components for a server or cluster of servers, according to one embodiment of the disclosure.

FIG. 3 is a block diagram of basic functional components for a server 106 or cluster of servers, according to one embodiment of the disclosure. In some embodiments, server 106 is configured to be a computer or computers operated by a third-party other than the carrier that operates the carrier networks to provision and implement the disclosed techniques. In other embodiments, the server 106 may be operated by one or more computers that operate the carrier networks.

The server 106 includes one or more processors 302, memory 304, and network interface 306. In some embodiments, each of the components including the processor(s) 302, memory 304, and network interface 306 is interconnected physically, communicatively, and/or operatively for inter-component communications.

As illustrated, processors 302 are configured to implement functionality and/or process instructions for execution within server 106. For example, processors 302 execute instructions stored in memory 304. Memory 304, which may be a non-transient, computer-readable storage medium, is configured to store information within server 106 during operation. In some embodiments, memory 304 includes a temporary memory, i.e., an area for information not to be maintained when the server 106 is turned off. Examples of such temporary memory include volatile memories such as random access memories (RAM), dynamic random access memories (DRAM), and static random access memories (SRAM). Memory 304 also maintains program instructions for execution by the processors 302.

The server 106 uses network interface 306 to communicate with external devices via one or more networks, such as the network 105 and/or the wireless network 108 in FIG. 1. Such networks may include one or more cellular networks, wireless networks, wired networks, fiber optics networks, and other types of networks through which communication between the server 106 and an external device may be established. Network interface 306 may be a network interface card, such as an Ethernet card, an optical transceiver, a radio frequency transceiver, or any other type of device that can send and receive information.

As mentioned above, the server 106 is configured to interact with one or more networks, such as the network 105 and/or the wireless network 108 of FIG. 1 to provide for faster and more reliable establishment of a connection and/or switching between the wireless communication device 102 and a base station 104, as disclosed herein. According to certain embodiments, the server 106 is configured to receive connectivity information from client devices that are connected to base stations. The connectivity information may include the device location, details about the connected base station, a frequency band and/or channel, and other metrics of the network. The connectivity information is stored in a memory, such as external database 112 in FIG. 1, or in a storage unit included in the server 106. The connectivity information can be aggregated by the server 106 by performing computations on the data. Embodiments of the disclosure leverage the connectivity information stored in the database 112 and use the information to improve band scanning and/or network switching, as disclosed in greater detail herein.

Figure 4:
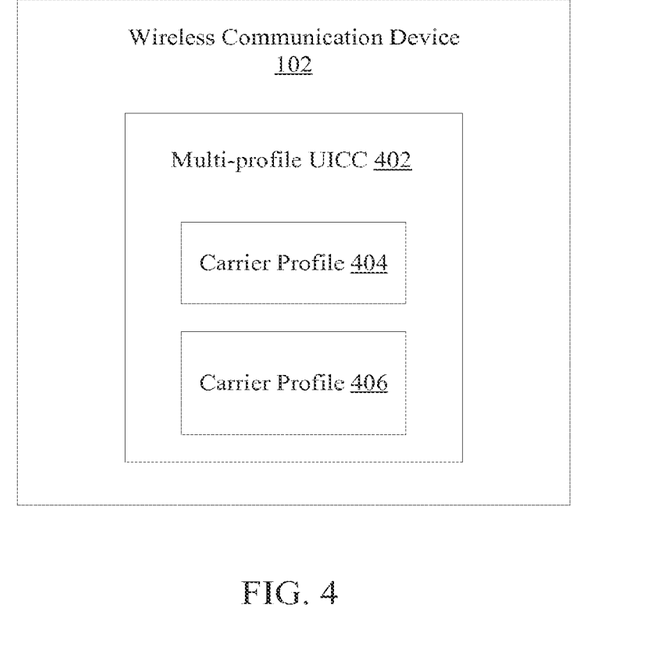
FIG. 4 is a conceptual diagram of a wireless communication device that includes a multi-profile Universal Integrated Circuit Card (UICC), according to one embodiment of the disclosure.

FIG. 4 is a conceptual diagram of a wireless communication device 102 that includes a multi-profile UICC 402, according to one embodiment of the disclosure. As shown, multi-profile UICC 402 includes multiple carrier profiles 404, 406. Additional carrier profiles may also be included on the multi-profile UICC 402. Each carrier profile provides the necessary information to allow the wireless communication device 102 to access a wireless carrier network associated with the carrier profile.

In some embodiments, the multi-profile UICC 402 is physical SIM card that is inserted into the wireless communication device 102. A SIM card can come in various dimensions. Traditionally, SIM cards are considered a Full-size SIM, a Mini-SIM, a Micro-SIM or a Nano-SIM. The Full-size SIM is approximately 85.6 mm in height, 53.98 mm in width and 0.76 mm in depth. The Mini-SIM is approximately 25 mm in height, 15 mm in width and 0.76 mm in depth. The Micro-SIM is approximately 15 mm in height, 12 mm in width and 0.76 mm in depth. The Nano-SIM is approximately 12.3 mm in height, 8.8 mm in width and 0.67 mm in depth.

In certain embodiments of the disclosure, the multi-profile UICC 402 is not designed to be inserted into wireless communication device 102. Rather, the mobile device 102 includes a dedicated memory configured to store a data representation of the multi-profile UICC 402 and the carrier profiles included therein. The dedicated memory may be a separate memory device integrated into the electrical architectural design of the wireless communication device 102 or may be a dedicated portion of memory 204 or a dedicated portion of storage device 208, as shown in FIG. 2. The dedicated memory is configured to store the carrier profiles 404, 406 on the multi-profile UICC 402. As the carrier profile data is secure data required for a wireless communication device 102 to access a subscriber network, the carrier profile data should be stored in a location within the wireless communication device 102 that will not be corrupted by other programs or applications operating on the wireless communication device 102. The dedicated memory provides such a secure location for the wireless communication device 102 to store the carrier profile data such that the carrier profile data can be accessed when necessary in order to provide the wireless communication device 102 with access credentials to the carrier network. In this regard, the dedicated memory is a secured dedicated memory.

As an aside, beyond having the carrier profile data stored in a secure location, the carrier profile data may be encrypted prior to storage. In this regard, an unauthorized user of the wireless communication device 102 will not be able to read the encrypted carrier profile data from the dedicated memory.

In some embodiments, the carrier profiles 404, 406 may be downloaded from a server configured to provision the carrier profiles. In other embodiments, the carrier profiles 404, 406 may be permanently stored on the SIM card 402, but can be deactivated. The deactivated carrier profiles can be activated by the server, e.g., after a user pays for and subscribes for a plan associated with the wireless network and the carrier profile.

Figure 5:
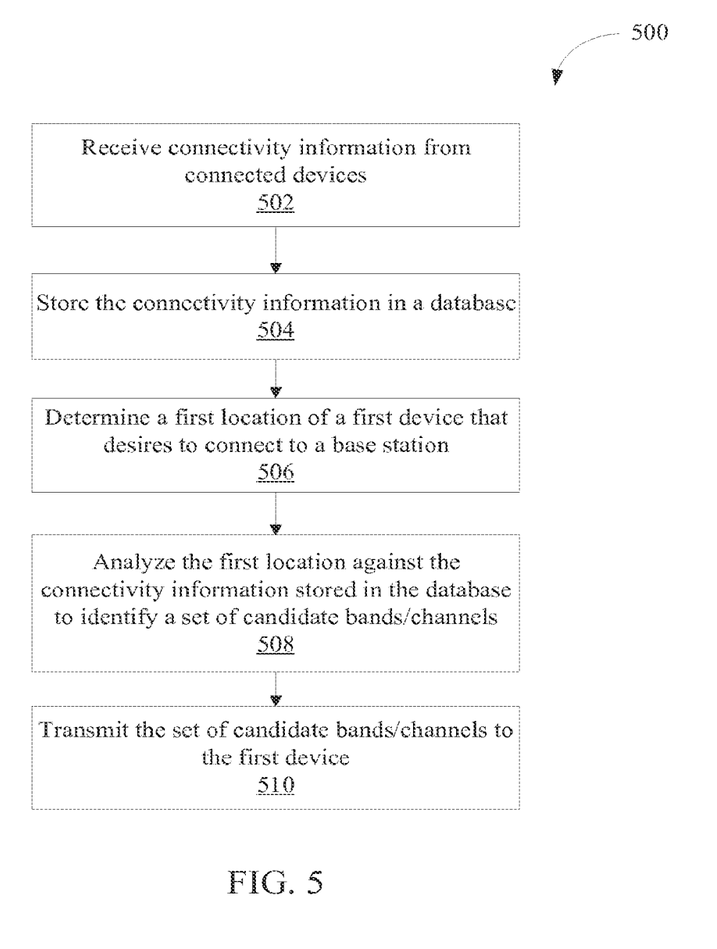
FIG. 5 is a flow diagram of method steps performed by a server or cluster of servers for providing a set of candidate bands and/or channels to a client device for connecting to a base station, according to one embodiment of the disclosure.

FIG. 5 is a flow diagram of method steps performed by a server or cluster of servers for providing a set of candidate bands and/or channels to a client device for connecting to a base station, according to one embodiment of the disclosure. As shown, the method 500 begins at step 502, where a server, such as server 106 in FIG. 1, receives connectivity information from a plurality of connected devices. The devices may be similar to the wireless communication device 102 shown in FIG. 1. The devices are connected to a plurality of base stations on one or more carrier networks. After a device connects to a carrier network via a base station, the device transmits connectivity information to the server. The connectivity information can be transmitted via a network associated with the connected base station or via another network. The connectivity information may include one or more of the device location, details about the connected base station (e.g., an identifier corresponding to the particular base station to which the device is connected), a frequency band of the connection, a channel of the connection, and other metrics of the network.

At step 504, the server stores the connectivity information in a database. The database can be an externally connected database, such as database 112 in FIG. 1, or a storage unit included in the server.

At step 506, the server determines a first location of a first device that desires to connect to a base station corresponding to a carrier network. The first location may be a current location of the first device or a predicted future location of the first device. The first location may be received via a network that includes a base station or via a wireless network, such as wireless network 108 in FIG. 1, which is distinct from a network that includes a base station.

The predicted future location of the first device can be determined in a variety of ways. For example, the server may aggregate past locations of the first device to calculate the predicted future location of the first device. The server may analyze the location information and an associated timestamp time for each location of first device periodically over time. The data may be collected from places where the first device spends a predominant amount of time, such as at a user's home or office. Further, the associated timestamps can be analyzed to determine the time the first device was at a particular location. In some embodiments, the determined geographic area, defined by the bulk of location information, is determined to be a primary use location, and the time window or time windows based on the bulk of the associated timestamps is determined to be a time window or time windows of the primary use location(s). Also, from this information, predicted future locations can be calculated based on known movement of the first device at particular times (e.g., driving from home to work in the morning or driving from work to home in the evening) and the particular route predicted to be taken during those times.

At step 508, the server analyzes the first location against the connectivity information stored in the database to identify a set of candidate bands and/or channels for the first device to use to attempt to connect to a base station. The server identifies the set of candidate bands and/or channels in an effort to locate the one or more bands and/or channels to which the first device will likely be able to connect at the first location. In some embodiments, the set of candidate bands and/or channels can be prioritized. In one embodiment, the first location is based on GPS coordinates of the first device. For examples, a location of each base station on the network may be stored at the server based on GPS coordinates of the base stations. Thus, when a device is attempting to connect to the network, the server can determine, based on comparing GPS coordinates of the device to the GPS coordinates of the base stations, which base station to which the client device is attempting to connect.

For example, if, at the first location, a carrier associated with a cellular plan of the first device owns three different bands (e.g., bands B1, B2, and B3), instead of having the first device scan the bands in order (i.e., B1 first, then B2, then B3) to attempt to connect to the base station, the first device can start scanning band B3 first if the server can identify, based on the aggregated connectivity information stored in the database, that there is no band B1 or B2 deployed in the first location. In another example, if another device D1 is in the same location as the first device (i.e., at the "first location") and is already connected to the base station using band B3 and channel C1, when the first device moves to the same covered area, the first device can attempt to connect to band B3 and channel C1 directly, without attempting to connect to bands B1 or B2 first. Another example is if both bands B1 and B2 are available, but almost all devices are on band B1, then the set of candidate bands and/or channels can include band B2 with higher priority over band B1, thereby getting better performance due to less congestion on the network.

At step 510, the server transmits the set of candidate bands and/or channels to the first device. As described, in some embodiments, the set of candidate bands and/or channels is prioritized. The first device can then use the set of candidate bands and/or channels to attempt to connect to the base station. In this manner, the first device may connect to the base station faster than using conventional techniques that simply scan the bands/channels in order or look to use previous bands/channels that the first device used to connect to the network. By leveraging the aggregated connectivity information of other devices, the disclosed technique provides for faster connectivity.

Also, in embodiments where the set of candidate bands and/or channels includes predicted future locations of the first device, the set of candidate bands and/or channels can be pre-stored on the first device before the first device is physically at the future location(s). Thus, once the first device actually arrives at the future location (now current location), the first device would have pre-stored the set of candidate bands and/or channels to attempt to connect to the network at such a location.

Advantageously, embodiments of the disclosure provide for more efficient base station connectivity. The disclosed method provides much more accurate band/channel information for the client device, greatly improves the possibility that the client device finds the right band and channel, and avoids unnecessary scans that can waste time and battery power. The disclosed method also has much better performance than a recently-connected channel listing, and works well when the client device moves to new locations. Also, the disclosed technique is self-managing, in that the knowledge about which bands and channels to use is obtained based on actual usage of the client devices in a particular location.

Figure 6:
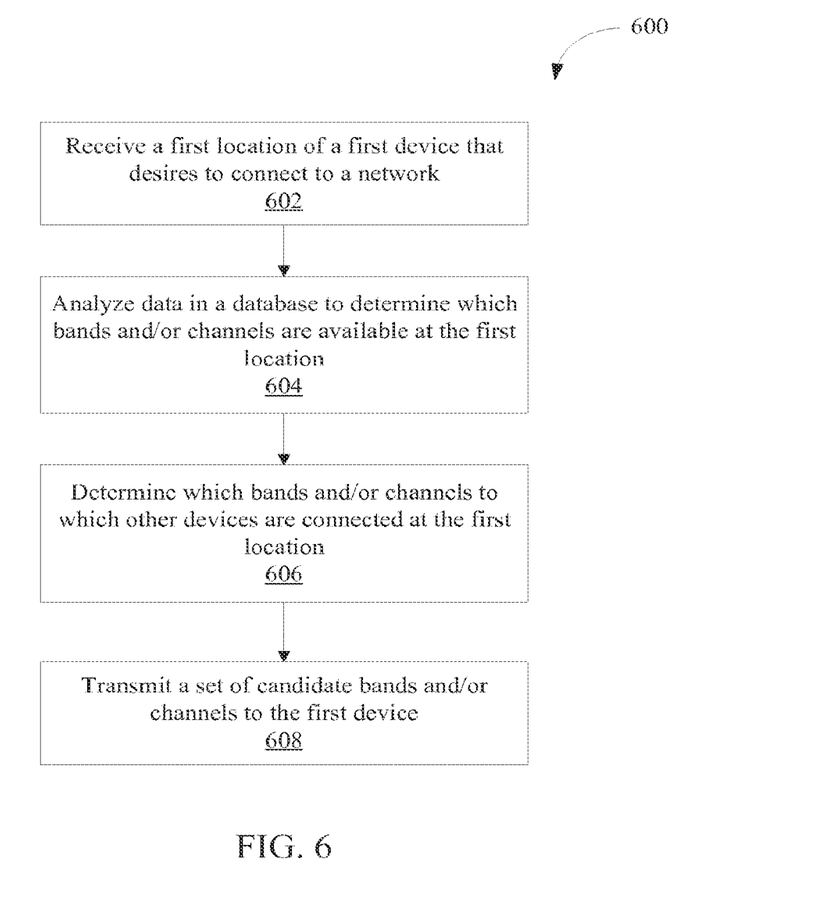
FIG. 6 is a flow diagram of method steps performed by a server or cluster of servers for providing a set of candidate bands and/or channels to a client device for connecting to a base station, according to one embodiment of the disclosure.

FIG. 6 is a flow diagram of method steps performed by a server or cluster of servers for providing a set of candidate bands and/or channels to a client device for connecting to a base station, according to one embodiment of the disclosure. As shown, the method 600 begins at step 602, where a server, such as server 106 in FIG. 1, receives a first location of a first device that desires to connect to a network. In some embodiments, the first location specifies a particular geographic area that is more specific than simply a country or region of the country (e.g., United States, United States—South, or United States—West Coast). For example, the first location may specify a particular neighborhood in a city or a particular building. The first location may be based on GPS coordinates. Alternatively, if the first device is already to connected to the internet via another network (such as wireless network 108 in FIG. 1), the first location may specify the particular wireless network to which the first device is connected and, thus, an accurate location of the first device (e.g., second floor of a particular building, a particular coffee shop, etc.).

At step 604, the server analyzes data in a database to determine which bands and/or channels are available at the first location. The data in the database may include connectivity information of one or more devices. For example, the connectivity information may include the device location, details about the connected base station (e.g., an identifier corresponding to the particular base station to which the device is connected), a frequency band of the connection, a channel of the connection, and/or other metrics of the network.

At step 606, the server determines the bands and/or channels to which other devices are connected at the first location. At step 608, transmits a set of candidate bands and/or channels to the first device. The set of candidate bands and/or channels may include a prioritized listing of the bands and/or channels for which the first device can attempt to connect to the network. The set of candidate bands and/or channels may include the bands and/or channels to which other devices are connected at the first location. In some embodiments, the order of the bands and/or channels in the set of candidate bands and/or channels is prioritized to avoid congestion on the network. For example, if two or more bands/channels are available at the first location, and most of the other devices are connected to one band/channel, then other bands/channels at the first location may be prioritized over the band/channel to which most of the other devices are connected.

Figure 7:
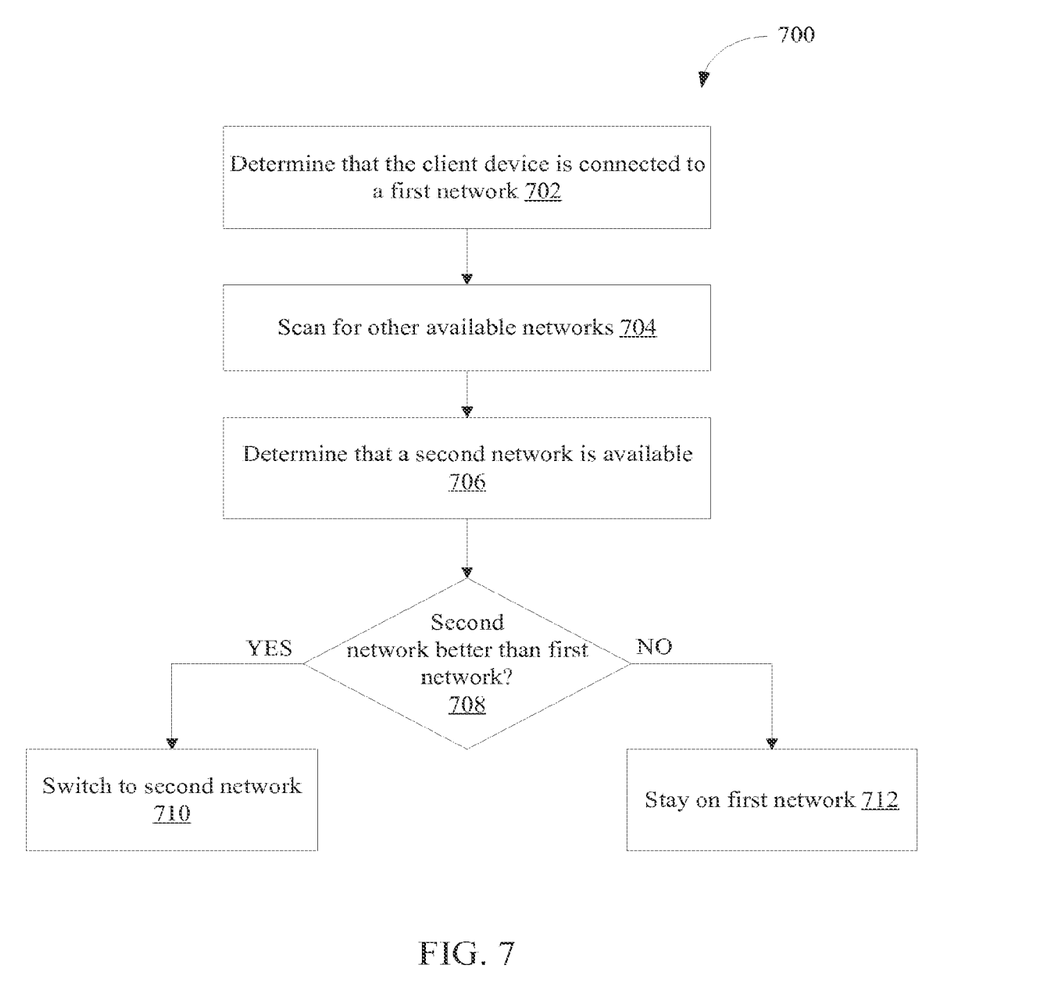
FIG. 7 is a flow diagram of method steps performed by a client device for switching to a different network, according to one embodiment of the disclosure.

FIG. 7 is a flow diagram of method steps performed by a client device for switching to a different network, according to one embodiment of the disclosure. As shown, the method 700 begins at step 702, where a client device, such as wireless communication device 102 in FIG. 1, determines that the client device is connected to a first network. The first network can be any network in which the client device communicates with a base station. Examples of the first network include: fourth generation (4G) cellular communications radio access technologies (such as a radio access technology implementing an LTE technology, such as LTE, LTE-Advanced (LTE-A), or other present or future developed LTE standard), a third generation (3G) radio access technology (such as a Wideband Code Division Multiple Access (WCDMA) or other Universal Mobile Telecommunications System (UMTS) network, such as a Time Division Synchronous Code Division Multiple Access (TD-SCDMA) network, a CDMA2000 radio access technology, such as a 1×RTT radio access technology, or other radio access technology standardized by the Third Generation Partnership Project 2 (3GPP2)), or a second generation (2G) radio access technology (such as a Global System for Mobile Communications (GSM) network), among others.

At step 704, the client device scans for other available networks. In one embodiment, the client device scans for other networks in the background processing of the device, possibly without any information regarding such processing being visible to a user. For example, scanning can be performed periodically, e.g., every five minutes.

At step 706, the client device determines that a second network is available. The second network can be any network in which the client device communicates with a base station. Examples include the same or similar networks to those that comprise the first network. The second network may be operated by the same carrier as the first network or by a different carrier than the first network.

At step 708, the client device determines whether the second network is better than the first network. In one embodiment, networks can be organized into two or more tiers. In one implementation, Tier 1 includes 4G networks (e.g., LTE, LTE-A), Tier 2 includes 3G network (e.g., WCDMA, UMTS, TD-SCDMA, CDMA2000, 1×RTT, 3GPP2), and Tier 3 includes 2G networks (e.g., GSM). A second network is considered to be better than a first network if the second network is in a higher tier than the tier of the first network. If the second network that is in the same tier as a first network, then the second network is not considered to be better than the first network.

In yet another embodiment, the client device can scan different radio frequencies to obtain the availability of other networks and network information, such as different carriers, different radio access technologies (e.g., tier information), and radio signal strength. The client device can take advantage of the knowledge about the available networks to determine whether a switch should be performed and to which carrier profile a switch should occur.

If at step 708 the client device determines that the second network is better than the first network, the method 700 proceeds to step 710, where the client device switches to second network. Switching to the second network may comprise performing the method 500 shown in FIG. 5, where the client device attempts to switch to a preferred channel and/or band based on a set of candidate channels and/or bands received from a server.

If at step 708 the client device determines that the second network is not better than the first network, the method 700 proceeds to step 712, where the client device stays on first network and does not switch to the second network.

The method 700 can be repeated periodically in the background of the client device, for example, every five minutes.

Advantageously, by using the disclosed background scanning technique, the client device can know the best available network in the real world, in the real-time, so that a switch would provide the best connectivity. Since the determination to switch is made while the client device is being used in the field in the real world and the network knowledge is obtained from the actual environment, the device can have an optimal switching strategy. Also, in some cases, the network infrastructure may have changed due to a hardware upgrade or outage. Since the disclosed background scanning technique provides real-time information, a switch can be made in real-time taking into account the upgrade or outage.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the objectives of the disclosure. Variations of those preferred embodiments may become apparent to those of ordinary skill in the art upon reading the foregoing description. The inventors expect skilled artisans to employ such variations as appropriate, and the inventors intend for the disclosed embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. In addition, one embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure. Therefore, the scope of the present disclosure is determined by the claims that follow.

What is claimed is:

1. A method, comprising:
   receiving, at a server, connectivity information from a plurality of client devices connected to one or more of a plurality of networks associated with one or more of a plurality of base stations;
   storing, at the server, the connectivity information in one or more memories;
   determining a first location and a currently connected network of a first device, the currently connected network being a first network of the plurality of networks;

identifying, by the server, a set of candidate bands and channels for connection to a second network of the plurality of networks via a first base station of the plurality of base stations by the first device at the determined first location and based on the connectivity information; and transmitting for delivery, from the server, the identified set of candidate bands and channels to the first device.

2. The method of claim 1, wherein, for a particular device connected to the one or more of the plurality of networks, the connectivity information includes one or more of: a location of the particular device, an identifier for a particular base station to which the particular device is connected, or a frequency band and channel of the connection between the particular device and the particular base station.

3. The method of claim 1, further comprising:
aggregating the connectivity information stored in the one or more memories based on location information.

4. The method of claim 1, wherein the first device attempts to connect to the second network based on attempting to connect to bands and channels included in the identified set of candidate bands and channels.

5. The method of claim 1, wherein
the plurality of client devices comprises the first device, and
identifying the set of candidate bands and channels comprises identifying one or more bands and channels that other devices of the plurality of client devices are connected to the network at the determined first location.

6. The method of claim 1, wherein the determined first location is a predicted future location of the first device.

7. The method of claim 6, wherein the predicted future location is based on aggregated GPS (Global Positioning System) coordinates received by the server from the first device.

8. The method of claim 6, wherein identifying the set of candidate bands and channels is based on comparing GPS coordinates of the first device to GPS coordinates of base stations on the second network to determine a particular base station to which the first device attempts to connect at the future location.

9. A computer-readable storage medium storing instructions that, when executed by a processor, cause a computer system to perform operations comprising:
receiving connectivity information from a plurality of client devices connected to one or more of a plurality of networks associated with one or more of a plurality of base stations;
storing the connectivity information in one or more memories;
determining a first location and a currently connected network of a first device, the currently connected network being a first network of the plurality of networks;
identifying a set of candidate bands and channels for connection to a second network of the plurality of networks via a first base station of the plurality of base stations by the first device at the determined first location and based on the connectivity information; and
transmitting for delivery the identified set of candidate bands and channels to the first device.

10. The computer-readable storage medium of claim 9, wherein, for a particular device connected to the one or more of the plurality of networks, the connectivity information includes one or more of: a location of the particular device, an identifier for a particular base station to which the particular device is connected, or a frequency band and channel of the connection between the particular device and the particular base station.

11. The computer-readable storage medium of claim 9, with further instructions stored thereon that, when executed by the processor, cause the computer to system to perform further operations comprising:
aggregating the connectivity information stored in one or more memories based on location information.

12. The computer-readable storage medium of claim 9, wherein the first device attempts to connect to the second network based on attempting to connect to bands and channels included in the identified set of candidate bands and channels.

13. The computer-readable storage medium of claim 9, wherein
the plurality of client devices comprises the first device, and
identifying the set of candidate bands and channels comprises identifying one or more bands and channels that other devices of the plurality of client devices are connected to the network at the determined first location.

14. The computer-readable storage medium of claim 9, wherein the determined first location is a predicted future location of the first device.

15. The computer-readable storage medium of claim 14, wherein the future location is based on aggregated GPS (Global Positioning System) coordinates received by the server from the first device.

16. The computer-readable storage medium of claim 14, wherein identifying the set of candidate bands and channels is based on comparing GPS coordinates of the first device to GPS coordinates of base stations on the second network to determine the particular base station to which the first device attempts to connect at the future location.

17. A client device configured to access a plurality of networks via one or more base stations, the client device comprising:
a radio access interface configured to access the one or more base stations;
a memory storing instructions; and
a processor, coupled to the radio access interface and the memory, that executes the instructions to:
connect to a first network of the plurality of networks;
receive, from a server via a wireless network, a set of candidate bands and channels for connection to a second network of the plurality of networks associated with a plurality of base stations of the one or more base stations, the set of candidate bands and channels having been identified by the server based on a location of the client device and connectivity information from a plurality of client devices connected to a cellular network associated with the plurality of base stations;
scan for an available base station of the plurality of base stations using the received set of candidate bands and channels; and
responsive to locating an available base station of the plurality of base stations based on the scanning, attempt to connect to the second network through the available base station.

18. The client device of claim 17, wherein the set of candidate bands and channels received from the server is based on a predicted future location of the client device.

19. The client device of claim 17, wherein the first network is operated by a first carrier and the second network is operated by a second carrier different from the first carrier.

20. The client device of claim 17, wherein the first network and the second network are both operated by a first carrier.

21. The client device of claim 18, wherein the processor further executes instructions to send the location of the client device to the server via the first network.

* * * * *